US012366855B2

(12) United States Patent
Liu et al.

(10) Patent No.: US 12,366,855 B2
(45) Date of Patent: Jul. 22, 2025

(54) ENVIRONMENT MONITORING SYSTEM AND METHOD FOR A TOWED RECREATIONAL VEHICLE

(71) Applicant: Polaris Industries Inc., Medina, MN (US)

(72) Inventors: Chiao George Liu, White Bear Lake, MN (US); Kyle T. Roggenkamp, Stacy, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 752 days.

(21) Appl. No.: 17/178,898

(22) Filed: Feb. 18, 2021

(65) Prior Publication Data

US 2021/0263513 A1   Aug. 26, 2021

Related U.S. Application Data

(60) Provisional application No. 62/981,913, filed on Feb. 26, 2020.

(51) Int. Cl.
*G05D 1/00* (2024.01)
*B60P 3/06* (2006.01)
(Continued)

(52) U.S. Cl.
CPC .............. *G05D 1/0033* (2013.01); *B60P 3/06* (2013.01); *B60P 3/10* (2013.01); *B60R 1/26* (2022.01);
(Continued)

(58) Field of Classification Search
CPC .......... G05D 1/0033; B60R 1/26; B60R 1/27; B60R 2300/105; B60R 2300/303; H04N 7/181; H04N 23/90
(Continued)

(56) References Cited

U.S. PATENT DOCUMENTS 5,176,234 A   1/1993   Reik et al.
6,112,845 A   9/2000   Oyama et al.
(Continued)

FOREIGN PATENT DOCUMENTS

CN   107031508 A   8/2017
CN   107433905 A   12/2017
(Continued)

OTHER PUBLICATIONS

English Translation of JP2013038794, Accessed Nov. 8, 2024 (Year: 2024).*
(Continued)

*Primary Examiner* — Krishnan Ramesh
(74) *Attorney, Agent, or Firm* — Merchant & Gould P.C.

(57) ABSTRACT

An environment of a tow vehicle may be monitored by displaying at least one image on a display remote from the tow vehicle based on data provided by a camera supported by the tow vehicle. The tow vehicle may be positioned on a trailer. The display may be supported by a tow vehicle towing the tow vehicle. In some instances, a recreational vehicle comprises a plurality of cameras, such that a subset of cameras may be automatically determined for presentation to an operator of the recreational vehicle, thereby presenting relevant information to the operator for use when maneuvering the vehicle.

2 Claims, 9 Drawing Sheets

(51) Int. Cl.
  *B60P 3/10* (2006.01)
  *B60R 1/26* (2022.01)
  *B60R 1/27* (2022.01)
  *H04N 7/18* (2006.01)
  *H04N 23/90* (2023.01)

(52) U.S. Cl.
  CPC .............. *B60R 1/27* (2022.01); *H04N 7/181* (2013.01); *H04N 23/90* (2023.01); *B60R 2300/105* (2013.01); *B60R 2300/303* (2013.01)

(58) Field of Classification Search
  USPC .......................................................... 701/36
  See application file for complete search history.

(56) References Cited

U.S. PATENT DOCUMENTS

| | | | |
|---|---|---|---|
| 7,712,845 | B2 | 5/2010 | Mackovjak et al. |
| 10,717,501 | B1* | 7/2020 | Gilhooley .............. G03B 29/00 |
| 2006/0250225 | A1 | 11/2006 | Widmann et al. |
| 2007/0267916 | A1 | 11/2007 | Mackovjak et al. |
| 2008/0024608 | A1* | 1/2008 | Hahn ...................... H04N 23/20 348/148 |
| 2008/0049106 | A1* | 2/2008 | Kallhammer ............ H04N 5/33 348/E5.09 |
| 2008/0068520 | A1 | 3/2008 | Minikey et al. |
| 2008/0143833 | A1* | 6/2008 | Yanai ...................... B60R 1/28 348/148 |
| 2009/0234543 | A1 | 9/2009 | Groitzsch et al. |
| 2010/0318255 | A1 | 12/2010 | Li et al. |
| 2011/0301825 | A1 | 12/2011 | Grajkowski et al. |
| 2012/0133768 | A1 | 5/2012 | Stephan |
| 2012/0152637 | A1 | 6/2012 | Hapka |
| 2013/0069337 | A1 | 3/2013 | Person et al. |
| 2013/0211716 | A1 | 8/2013 | Kellar |
| 2013/0250097 | A1* | 9/2013 | Choi ...................... G01C 21/36 348/118 |
| 2014/0103627 | A1 | 4/2014 | Deckard et al. |
| 2014/0151979 | A1 | 6/2014 | Puckett et al. |
| 2014/0347489 | A1 | 11/2014 | Kumon |
| 2015/0195052 | A1 | 7/2015 | Fan et al. |
| 2015/0259035 | A1* | 9/2015 | Carli ...................... B63H 21/38 440/88 A |
| 2015/0350607 | A1 | 12/2015 | Kim et al. |
| 2016/0075386 | A1 | 3/2016 | Zuchoski et al. |
| 2016/0121924 | A1 | 5/2016 | Norstad |
| 2016/0134809 | A1* | 5/2016 | Ishikuri ................ H04N 23/698 348/36 |
| 2016/0159395 | A1 | 6/2016 | Kim |
| 2016/0167655 | A1 | 6/2016 | Minami |
| 2016/0375831 | A1* | 12/2016 | Wang ...................... G06F 3/048 348/148 |
| 2017/0136916 | A1 | 5/2017 | Heisel et al. |
| 2017/0217368 | A1 | 8/2017 | Lewis et al. |
| 2017/0225710 | A1 | 8/2017 | Yu et al. |
| 2017/0270374 | A1 | 9/2017 | Myers et al. |
| 2017/0341583 | A1 | 11/2017 | Zhang et al. |
| 2017/0352275 | A1* | 12/2017 | Maruyama ............ G01S 13/931 |
| 2018/0056783 | A1 | 3/2018 | Safranski et al. |
| 2018/0056871 | A1 | 3/2018 | Karner et al. |
| 2018/0141543 | A1 | 5/2018 | Krosschell et al. |
| 2018/0156329 | A1 | 6/2018 | Hose |
| 2018/0210465 | A1* | 7/2018 | Qu .......................... G06T 7/593 |
| 2019/0007597 | A1 | 1/2019 | Cordeiro |
| 2019/0061762 | A1 | 2/2019 | Bemetz et al. |
| 2019/0118711 | A1* | 4/2019 | Kim ........................ H04N 23/63 |
| 2019/0118717 | A1 | 4/2019 | Blank et al. |
| 2019/0152493 | A1 | 5/2019 | Pongo et al. |
| 2019/0184985 | A1 | 6/2019 | Tokish et al. |
| 2019/0337497 | A1 | 11/2019 | Scheuerell et al. |
| 2019/0344716 | A1* | 11/2019 | Ziethén et al. ........... B60R 1/28 |
| 2020/0094896 | A1 | 3/2020 | Nolin et al. |
| 2020/0156543 | A1* | 5/2020 | Kubota ................... B60R 1/26 |
| 2020/0290613 | A1 | 9/2020 | Trainor et al. |
| 2020/0329216 | A1 | 10/2020 | Ribighini |
| 2020/0344412 | A1* | 10/2020 | Shimizu ................. H04W 4/027 |
| 2020/0406819 | A1* | 12/2020 | Berne ...................... B60R 1/28 |
| 2021/0118184 | A1* | 4/2021 | Pillai ...................... G06N 3/088 |
| 2021/0162926 | A1* | 6/2021 | Lu ............................ B60R 1/26 |
| 2021/0323515 | A1 | 10/2021 | Scheuerell et al. |
| 2022/0116741 | A1 | 4/2022 | Rentz et al. |
| 2022/0165066 | A1* | 5/2022 | Aoki ...................... H04N 23/54 |
| 2022/0360693 | A1* | 11/2022 | Stein ...................... G01C 11/02 |

FOREIGN PATENT DOCUMENTS

| | | | |
|---|---|---|---|
| CN | 108604320 A | 9/2018 | |
| CN | 208376630 U | 1/2019 | |
| DE | 19910153 | 1/2001 | |
| DE | 102014215786 A1 | 2/2016 | |
| JP | 2002-234399 A | 8/2002 | |
| JP | 2006-214726 A | 8/2006 | |
| JP | 2013038794 A * | 2/2013 | ............... B60R 1/00 |
| JP | 2014-106786 A | 6/2014 | |
| JP | 2015-039268 A | 2/2015 | |
| JP | 2015-205540 A | 11/2015 | |
| KR | 10-2020-0020035 A | 2/2020 | |

OTHER PUBLICATIONS

Michael Wayland, "What if you could see through your trailer?", Automotive News, Apr. 8, 2019; 3 pages.
Hard-wired backup camera, 1960 Airstream Ambassador Blog!, Hosted by The Vintage Airstream Podcast, Jan. 27, 2020; 9 pages.
Pro Trailer Backup Assist, Ford Co-Pilot 360 Technology, Jan. 27, 2020; 7 pages.
Using the Rearview Camera in a Classic, Airstream, Feb. 16, 2017; 4 pages.
Bryon Dorr, Invisible Tow-Behind: GMC Launches 'Transparent Trailer View', Gear Junkie, Feb. 12, 2019; 8 pages.
International Preliminary Report on Patentability received for PCT Patent Application No. PCT/US21/28188, mailed on Nov. 3, 2022, 10 pages.
International Search Report and Written Opinion received for PCT Patent Application No. PCT/US21/28188, mailed on Sep. 23, 2021, 14 pages.
Invitation to Pay Additional Fees received for PCT Patent Application No. PCT/US21/28188, mailed on Jun. 28, 2021, 3 pages.

* cited by examiner

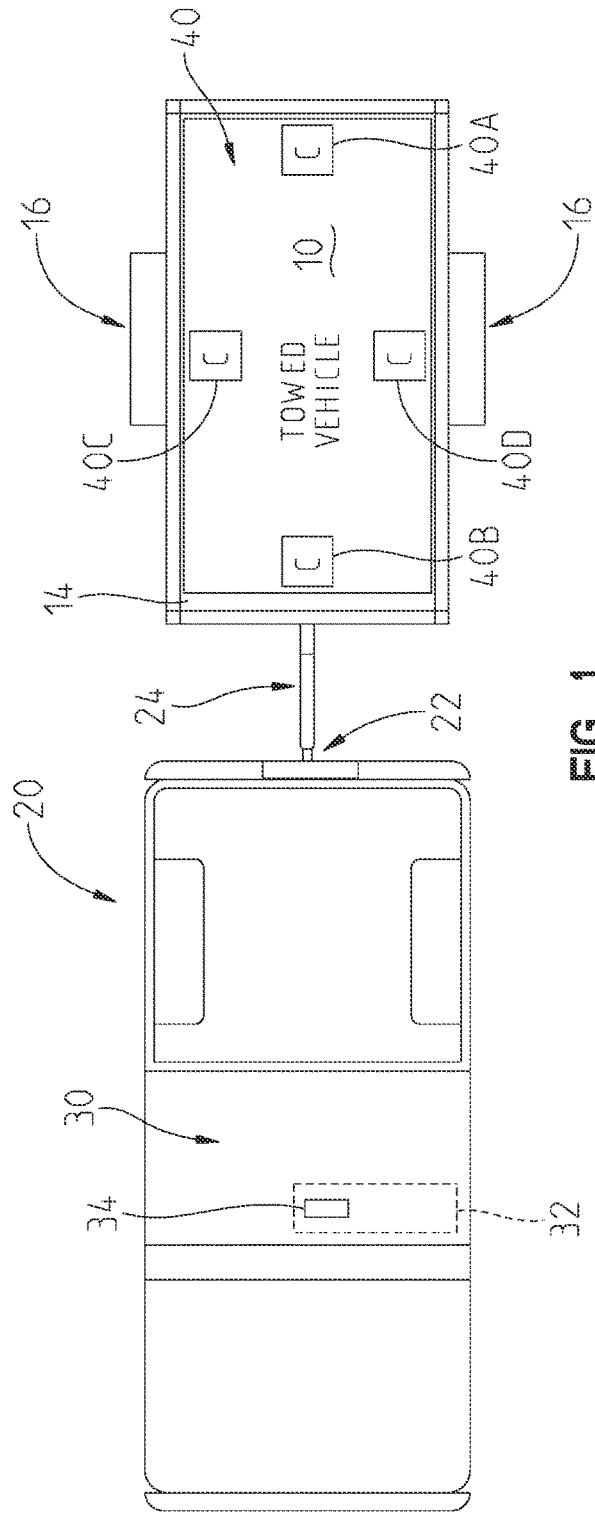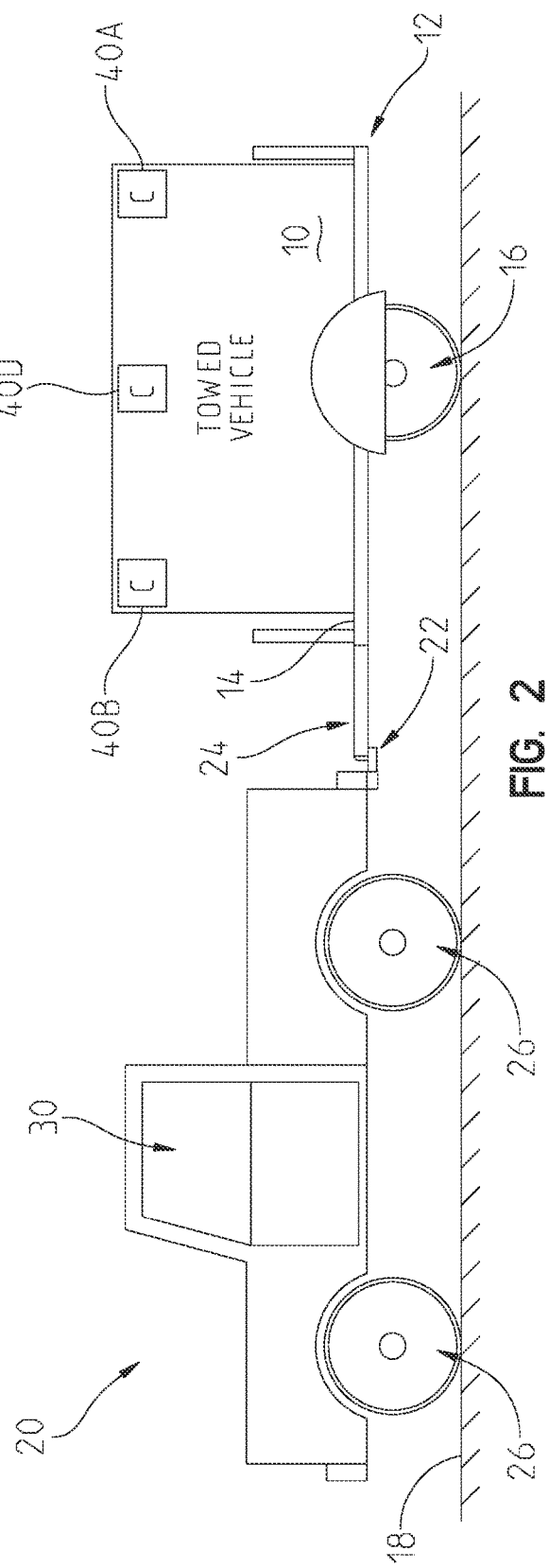

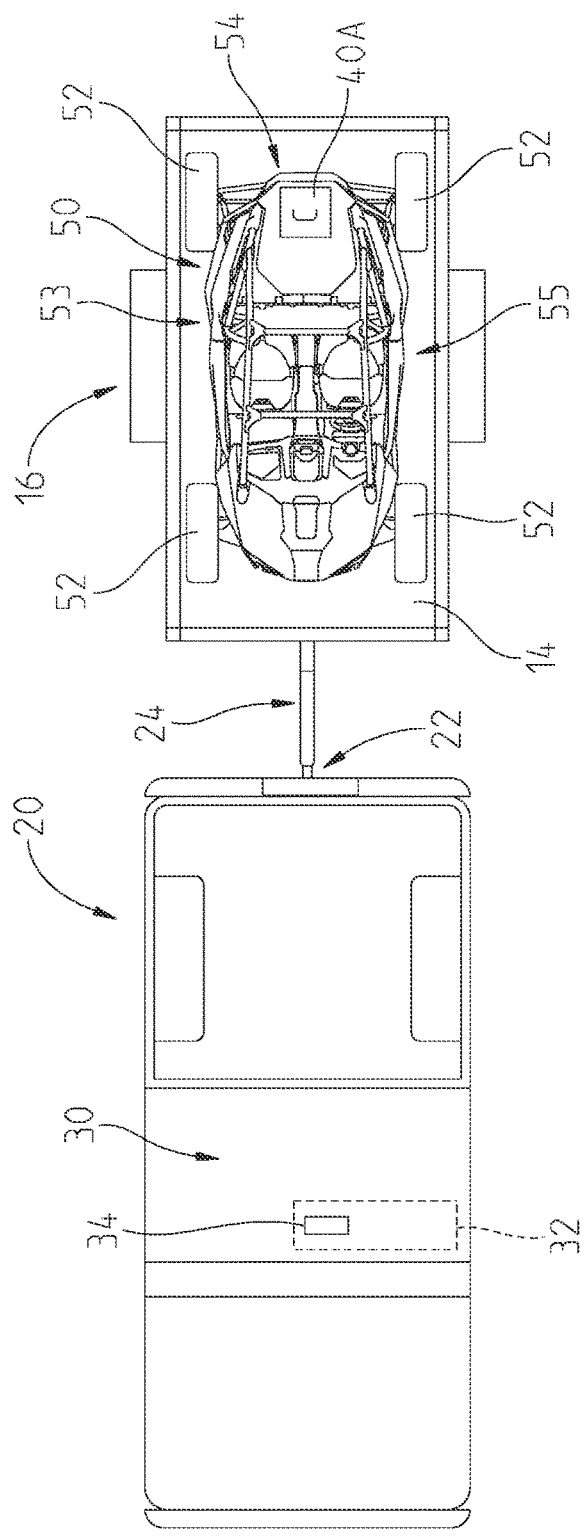
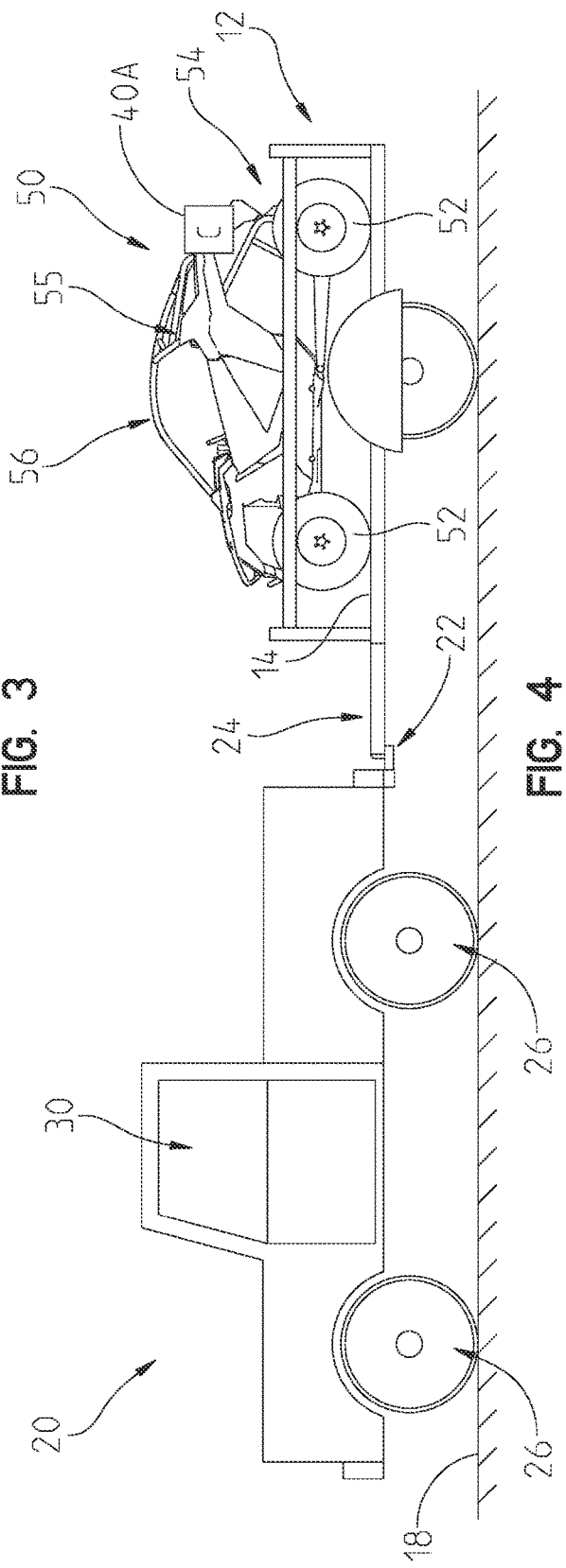

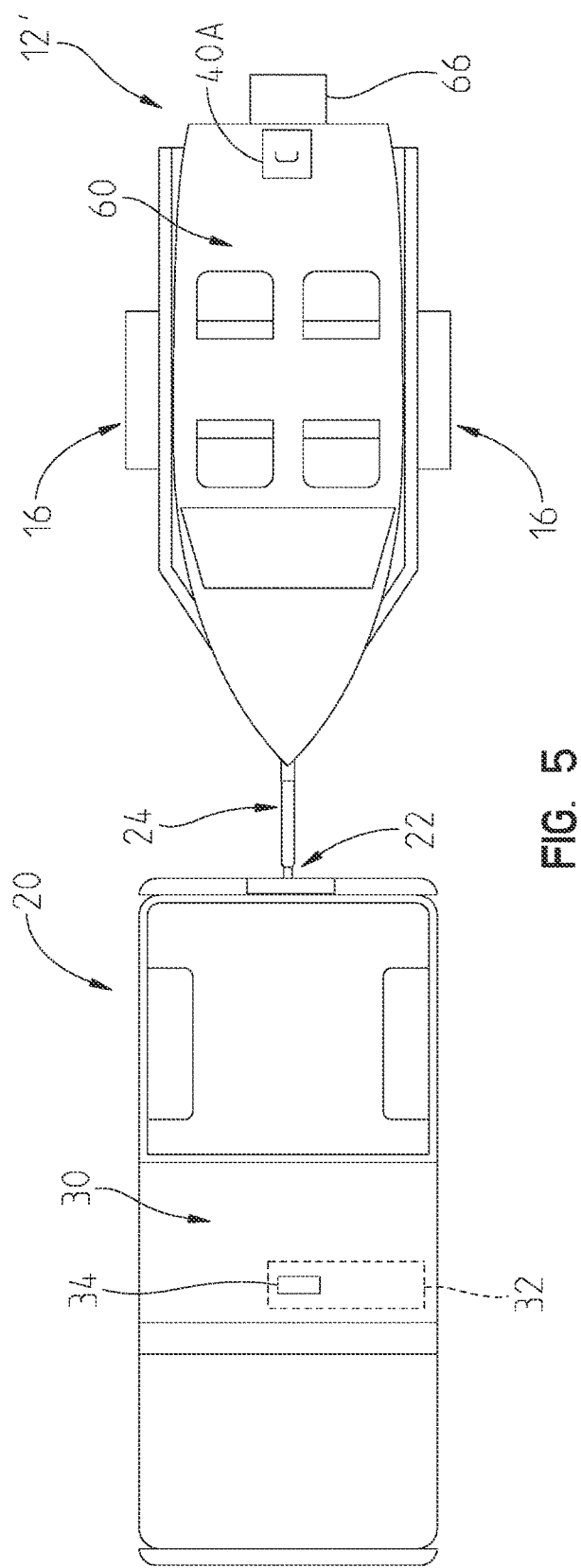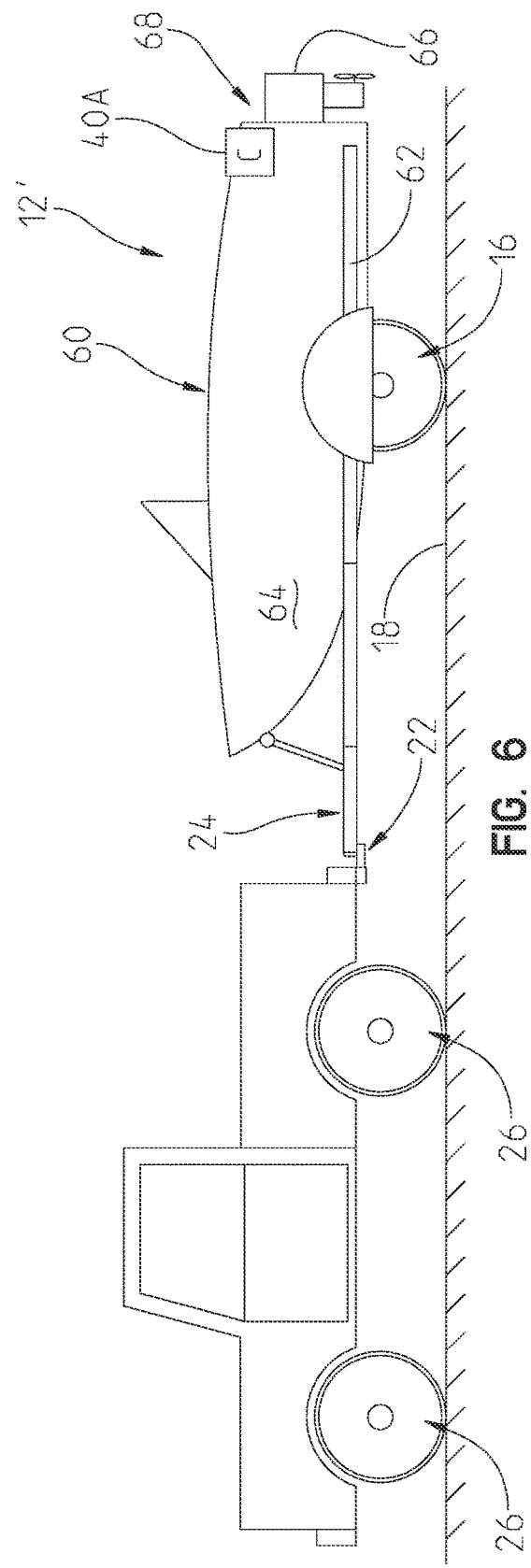
FIG. 5
FIG. 6

ENVIRONMENT MONITORING SYSTEM AND METHOD FOR A TOWED RECREATIONAL VEHICLE

CROSS-REFERENCE TO RELATED APPLICATION

This application claims priority to U.S. Provisional Application No. 62/981,913, titled "Environment Monitoring System and Method for a Towed Recreational Vehicle," filed on Feb. 26, 2020, the entire disclosure of which is hereby incorporated by reference in its entirety.

BACKGROUND AND SUMMARY

The present disclosure relates to systems and methods which provide information of an environment surrounding a towed recreational vehicle and, in particular, provide at least visual information of an environment surrounding a towed recreational vehicle.

Recreational vehicles, such as side-by-side off-road vehicles, snowmobiles, ATVs, utility vehicles, and boats, are widely used for recreational purposes. These recreational vehicles are often supported by a trailer for transport from place-to-place.

The present application discloses systems and methods which provide information of an environment surrounding a towed recreational vehicle. In embodiments, the information regarding the environment surrounding a towed recreational vehicle incudes visual information. In embodiments, one or more cameras supported by the towed vehicle provide visual information to a remote display which is positioned within an operating area of a tow vehicle, such as a truck. In embodiments, the remote display is a part of the operator interface of the tow vehicle. In embodiments, the remote display is a removeable display unit of the towed vehicle that may be positioned within the operator area of the tow vehicle. In embodiments, the remote display is a part of a personal computing device, such as a mobile phone that may be positioned within the operator area of the tow vehicle.

In an exemplary embodiment of the present disclosure, a recreational vehicle for communication with a remote device and sized and shaped for placement upon a trailer is provided. The recreational vehicle having a plurality of ground engaging members supporting at least one recreational vehicle support member. The recreational vehicle comprising: a frame; a propulsion system supported by the frame to propel the recreational vehicle towards the trailer; a steering system coupled to the frame to establish a direction of travel of the recreational vehicle; a control system operatively coupled to the propulsion system and the steering system, the control system controlling the direction and a speed of the recreational vehicle; and a plurality of cameras supported by the frame. The propulsion system having a first powered configuration to power movement of the recreational vehicle and a second non-powered configuration wherein the propulsion system is unable to power movement of the recreational vehicle. The plurality of cameras operatively coupled to the control system to monitor at least a portion of the environment surrounding the recreational vehicle. The plurality of cameras including a rear view camera positioned to monitor a rear of the recreational vehicle. The control system provides data captured by the rear view camera to the remote device while the recreational vehicle is supported on the at least one recreational vehicle support members of the trailer and the propulsion system of the recreational vehicle is in the second non-powered configuration.

In an example thereof, the recreational vehicle further comprising a display supported by the frame of the recreational vehicle and removeably coupled to the recreational vehicle, the display being the remote device when removed from the recreational vehicle. In a further example thereof, the remote device includes a display. In a variation thereof, the remote device is a personal computing device.

In another example thereof, the remote device is part of an operator interface of a tow vehicle towing the trailer. In yet another example thereof, in the non-powered configuration of the recreational vehicle a prime mover of the propulsion system is powered off. In still another example thereof, in the non-powered configuration of the recreational vehicle a transmission of the propulsion system is in a park setting.

In another exemplary embodiment of the present disclosure, a method of visualization of a portion of the environment proximate a recreational vehicle trailing a tow vehicle is provided. The method comprising: receiving with an electronic controller data from a camera supported by the recreational vehicle while the recreational vehicle is in a towed state to be pulled by the tow vehicle; and displaying with the electronic controller an image on a display remote from the recreational vehicle based on the received data from the camera.

In an example thereof, the method further comprises providing a propulsion system for the recreational vehicle to propel the recreational vehicle towards the trailer, the propulsion system having a first powered configuration to power movement of the recreational vehicle and a second non-powered configuration wherein the propulsion system is unable to power movement of the recreational vehicle. In a variation thereof, the receiving step occurs while the propulsion system of the recreational vehicle is in the non-powered configuration.

In another example thereof, the camera is a visible light camera. In a further example thereof, the recreational vehicle is supported by a trailer coupled to the tow vehicle. In still another example thereof, the recreational vehicle is supported by the tow vehicle. In yet a further example thereof, the recreational vehicle is supported by the ground and coupled to the tow vehicle through a connecting member.

In a further exemplary embodiment, a recreational vehicle for communication with a remote device supported by a tow vehicle when the recreational vehicle is being towed by the tow vehicle is provided. The recreational vehicle comprising: a frame; a propulsion system supported by the frame to propel the recreational vehicle; a steering system coupled to the frame to establish a direction of travel of the recreational vehicle; a control system operatively coupled to the propulsion system and the steering system, the control system controlling the direction and a speed of the recreational vehicle; and a plurality of cameras supported by the frame. The propulsion system having a first powered configuration to power movement of the recreational vehicle and a second non-powered configuration wherein the propulsion system is unable to power movement of the recreational vehicle. The plurality of cameras operatively coupled to the control system to monitor at least a portion of the environment surrounding the recreational vehicle. The control system provides data captured by at least one of the plurality of cameras to the remote device supported by the tow vehicle while the propulsion system of the recreational vehicle is in the second non-powered configuration.

In an example thereof, the recreational vehicle further comprises a display supported by the frame of the recreational vehicle and removeably coupled to the recreational vehicle, the display being the remote device when removed from the recreational vehicle.

In another example thereof, the remote device includes a display. In a variation thereof, the remote device is a personal computing device. In a further example thereof, the remote device is part of an operator interface of a tow vehicle towing the trailer. In still another example thereof, in the non-powered configuration of the recreational vehicle a prime mover of the propulsion system is powered off. In a further still example thereof, in the non-powered configuration of the recreational vehicle a transmission of the propulsion system is in a neutral setting.

In yet another exemplary embodiment of the present disclosure, a method of visualization of a portion of the environment proximate a recreational vehicle having a prime mover to power a movement of the recreational vehicle is provided. The recreational vehicle trailing a tow vehicle. The method comprising: receiving with an electronic controller data from a recreational vehicle camera supported by the recreational vehicle while the recreational vehicle is in a towed state to be pulled by the tow vehicle; receiving with an electronic controller data from a tow vehicle camera supported by the tow vehicle; and displaying with the electronic controller at least one image on a display remote from the recreational vehicle based on the received data from the recreational vehicle camera and the tow vehicle camera.

In an example thereof, the towed state of the recreational vehicle comprises when a prime mover of the recreational vehicle is powered off. In another example thereof, the towed state of the recreational vehicle comprises when a transmission of the recreational vehicle is in a park setting. In a further example thereof, the method further comprises generating the at least one image by stitching together the data from the recreational vehicle camera and the data from the tow vehicle camera. In yet another example thereof, the tow vehicle comprises the electronic controller; and the data from the recreational vehicle camera is received by the electronic controller via a wireless network.

In yet still another exemplary embodiment of the present disclosure, a method of visualization of a portion of the environment proximate a recreational vehicle having a prime mover to power a movement of the recreational vehicle is provided. The recreational vehicle trailing a tow vehicle and positioned on a trailer supporting the recreational vehicle. The method comprising: receiving with an electronic controller data from a recreational vehicle camera supported by the recreational vehicle while the recreational vehicle is in a towed state to be pulled by the tow vehicle; receiving with an electronic controller data from a trailer camera supported by the trailer; and displaying with the electronic controller at least one image on a display remote from the recreational vehicle based on the received data from the recreational vehicle camera and the trailer camera.

In an example thereof, the towed state of the recreational vehicle comprises when a prime mover of the recreational vehicle is powered off. In another example thereof, the towed state of the recreational vehicle comprises when a transmission of the recreational vehicle is in a park setting. In yet another example thereof, the method further comprises generating the at least one image by stitching together the data from the recreational vehicle camera and the data from the trailer camera. In a further still example, the tow vehicle comprises the electronic controller; and the data from the recreational vehicle camera is received by the electronic controller via a wireless network.

In a further exemplary embodiment of the present disclosure, a method of automatically presenting an image from a subset of cameras to an operator of a recreational vehicle is provided. The method comprising: determining a direction of travel of the recreational vehicle; generating, based on the determined direction of travel, the subset of cameras from a set of cameras supported by the recreational vehicle, wherein the set of cameras comprises: a first camera positioned to monitor a first portion of an environment associated with a rear of the recreational vehicle; and a second camera positioned to monitor a second portion of the environment different from the first portion of the environment; receiving with an electronic controller data from the generated subset of cameras supported by the recreational vehicle; and providing by the electronic controller an image for presentation by a display based on the received data from the camera.

In an example thereof, the direction of travel of the recreational vehicle is determined based on data from a steering controller of the recreational vehicle. In another example thereof, the direction of travel of the recreational vehicle is determined using GPS data associated with the recreational vehicle. In a further example thereof, generating the subset of cameras comprises selecting the second camera based on a mapping between the direction of travel and the second camera. In yet another example thereof, the generated subset of cameras comprises the first camera and the second camera, and the method further comprises: stitching together a first data output of the first camera and a second data output of the second camera to generate the image; determining a center for the generated image based on the determined direction of travel; and providing the generated image for presentation by the display according to the determined center. In a further still example thereof, the method further comprising:

determining a change in the direction of travel of the recreational vehicle; and in response to determining the change in the direction of travel, generating an updated subset of cameras based on the changed direction of travel.

In a further still exemplary embodiment of the present disclosure, a recreational vehicle is provided. The recreational vehicle comprising: a frame; a propulsion system supported by the frame to propel the recreational vehicle; a steering system coupled to the frame to establish a direction of travel of the recreational vehicle; a control system operatively coupled to the propulsion system and the steering system, the control system controlling the direction and a speed of the recreational vehicle; and a plurality of cameras supported by the frame, the plurality of cameras operatively coupled to the control system to monitor at least a portion of the environment surrounding the recreational vehicle, wherein the control system: automatically selects a camera of the plurality of cameras based on data from at least one of the propulsion system and the steering system; and provides data captured by the selected camera for display.

Additional features of the present disclosure will become more apparent to those skilled in the art upon consideration of the following detailed descriptions of illustrative embodiments.

BRIEF DESCRIPTION OF THE DRAWINGS

Advantages and features of the embodiments of this disclosure will become more apparent from the following detailed description of exemplary embodiments when viewed in conjunction with the accompanying drawings, wherein:

FIG. 1 is a top view of a tow vehicle towing a trailer supporting a representative towed vehicle;

FIG. 2 is a side view of the tow vehicle, trailer, and towed vehicle of FIG. 1;

FIG. 3 is a top view of a tow vehicle towing a trailer supporting a representative side-by-side recreational vehicle;

FIG. 4 is a side view of the tow vehicle, trailer, and towed side-by-side recreational vehicle of FIG. 3;

FIG. 5 is a top view of a tow vehicle towing a trailer supporting a representative boat;

FIG. 6 is a side view of the tow vehicle, trailer, and towed boat of FIG. 5;

DETAILED DESCRIPTION OF THE DRAWINGS

Figure 7:
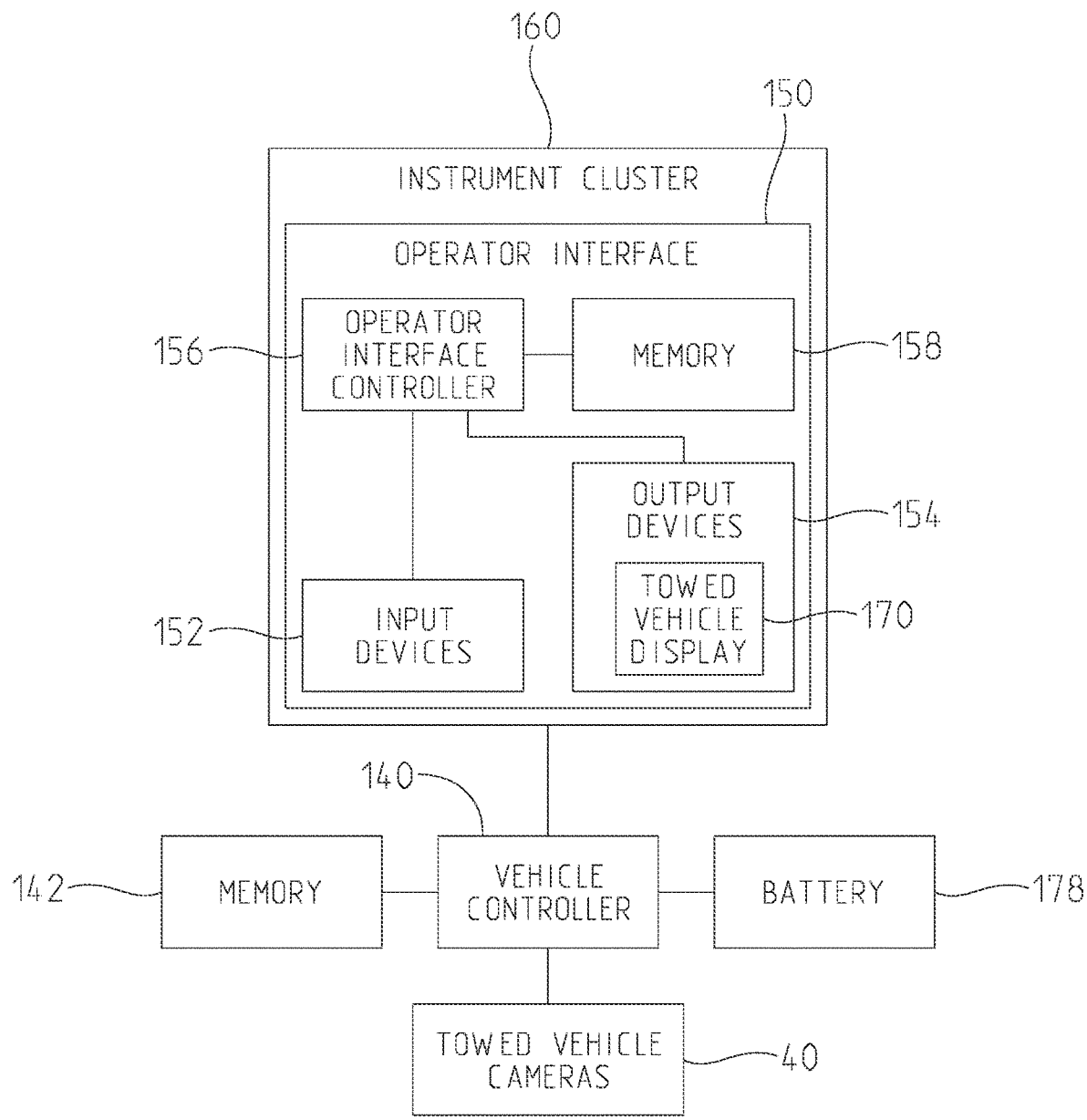
FIG. 7 is a representative view of exemplary components of the recreational vehicle of FIGS. 3 and 4.

Various embodiments of the present disclosure will be described in detail with reference to the drawings, wherein like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments for the claimed invention.

Referring to FIGS. 1 and 2, a representative recreational vehicle 10 is shown positioned on a trailer 12. A support 14 of trailer 12 supports recreational vehicle 10. Trailer 12 includes a plurality of ground engagement members 16 which support the support 14 and recreational vehicle 12 above the ground 18.

Trailer 12 is towed by a vehicle, illustratively a truck 20. Truck 20 includes a hitch 22 which is coupled to a tongue 24 of trailer 12. Truck 20 includes a plurality of ground engaging members 26 which support truck 20 relative to the ground 18. Truck 20 includes an operator area 30 in which is situated conventional steering controls (not shown) actuatable by a driver to steer truck 20, a brake input (not shown) actuatable by a driver to brake truck 20, and drive line controls (not shown) actuatable by a driver to accelerate truck 20 and shift gears of a transmission (not shown) of truck 20. Additionally, truck 20 in operator area 30 includes a plurality of output devices 32 which provide feedback to the operator of truck 20 on the operation of truck 20. Exemplary output devices include lights, gauges, and displays. An exemplary display 34 is represented in FIG. 1. As explained in more detail herein, in embodiments, information generated by one or more systems of recreational vehicle 10 may be displayed on display 34.

As shown in FIGS. 1 and 2, recreational vehicle 10 includes a plurality of cameras 40, illustratively a rear camera 40A positioned at a rear of recreational vehicle 10, a front camera 40B positioned at a front of recreational vehicle 10, a right side camera 40C positioned along a right side of vehicle 10, and a left side camera 40D positioned along a left side of vehicle 10. Each of cameras 40 may be visible light cameras, infrared cameras, stereo cameras, and other types of cameras. Further, proximity sensors may be included to provide a warning to an operator of towed vehicle 10 or tow vehicle 20 of close proximity to a surrounding object. Exemplary proximity sensors include radar systems, LIDAR systems, and ultrasonic systems may be used. Each of cameras 40, when active, provide images of a portion of the environment surrounding recreational vehicle 10. Although each of cameras 40A-D are shown positioned high on towed vehicle 10, the location of one or more of cameras 40A-D may be lower. Although only one camera 40 is shown on each side of towed vehicle 10, more than one camera may be provided on one or more sides of towed vehicle 10. Further, one or more cameras 40 may be provided on a top portion of towed vehicle 10, such as a roof or top portion of a roll cage.

Referring to FIGS. 3 and 4, a side-by-side recreational vehicle 50 is shown supported on support 14 of trailer 12. Side-by-side recreational vehicle 50 includes a plurality of ground engaging members 52 which support side-by-side recreational vehicle 50 when placed on the ground 18 and relative to support 14 when placed on trailer 12. Side-by-side recreational vehicle 50 additionally includes at least one camera 40A positioned at a rear end 54 of side-by-side recreational vehicle 50. Additional cameras 40 may be supported by side-by-side recreational vehicle 50, such as at a front end of side-by-side recreational vehicle 50, on a B-pillar 53 on a right side of side-by-side recreational vehicle 50, on a B-pillar 55 on a left side of side-by-side recreational vehicle 50, on a roll cage 56, and/or other suitable locations.

Exemplary side-by-side recreational vehicle 50 include the RZR brand side-by-side recreational vehicle available from Polaris Industries Inc. located at 2100 Hwy. 55 in Medina, MN 55340. Exemplary side-by-side recreational vehicle 50 are disclosed in U.S. Pat. No. 10,369,886, the entire disclosures of which are expressly incorporated by reference herein.

Exemplary towed states of side-by-side recreational vehicle 50 include when side-by-side recreational vehicle 50 is positioned on trailer 12, when side-by-side recreational vehicle 50 is supported by truck 12 (such as in a bed of truck 20), and when side-by-side recreational vehicle 50 is positioned on the ground and coupled to truck 20 through a rope, chain, or other connecting member.

Referring to FIGS. 5 and 6, a boat 60 is shown supported on support 14 of trailer 12. Boat 60 includes a lower hull 64 which supports boat 60 when placed in the water (not shown) and relative to support 62 of trailer 12' when placed on trailer 12'. Boat 60, alternatively may include one or more pontoons which support boat 60 when placed in the water and on support 62 when placed on trailer 12'. Boat 60 additionally includes at least one camera 40A positioned at a stern 68 of boat 60 forward of an outboard motor 66 of boat 60. Additional cameras 40 may be supported by boat 60, such as at a bow end of boat 60, on a starboard side of boat 60, on a port side of boat 60, and/or other suitable locations. Exemplary towed states of boat 60 include when boat 60 is positioned on trailer 16. Exemplary boats 60 include the line of pontoon boats available from Bennington Marine located at 2805 Decio Drive in Elkhart, Indiana 46514.

Figure 8:
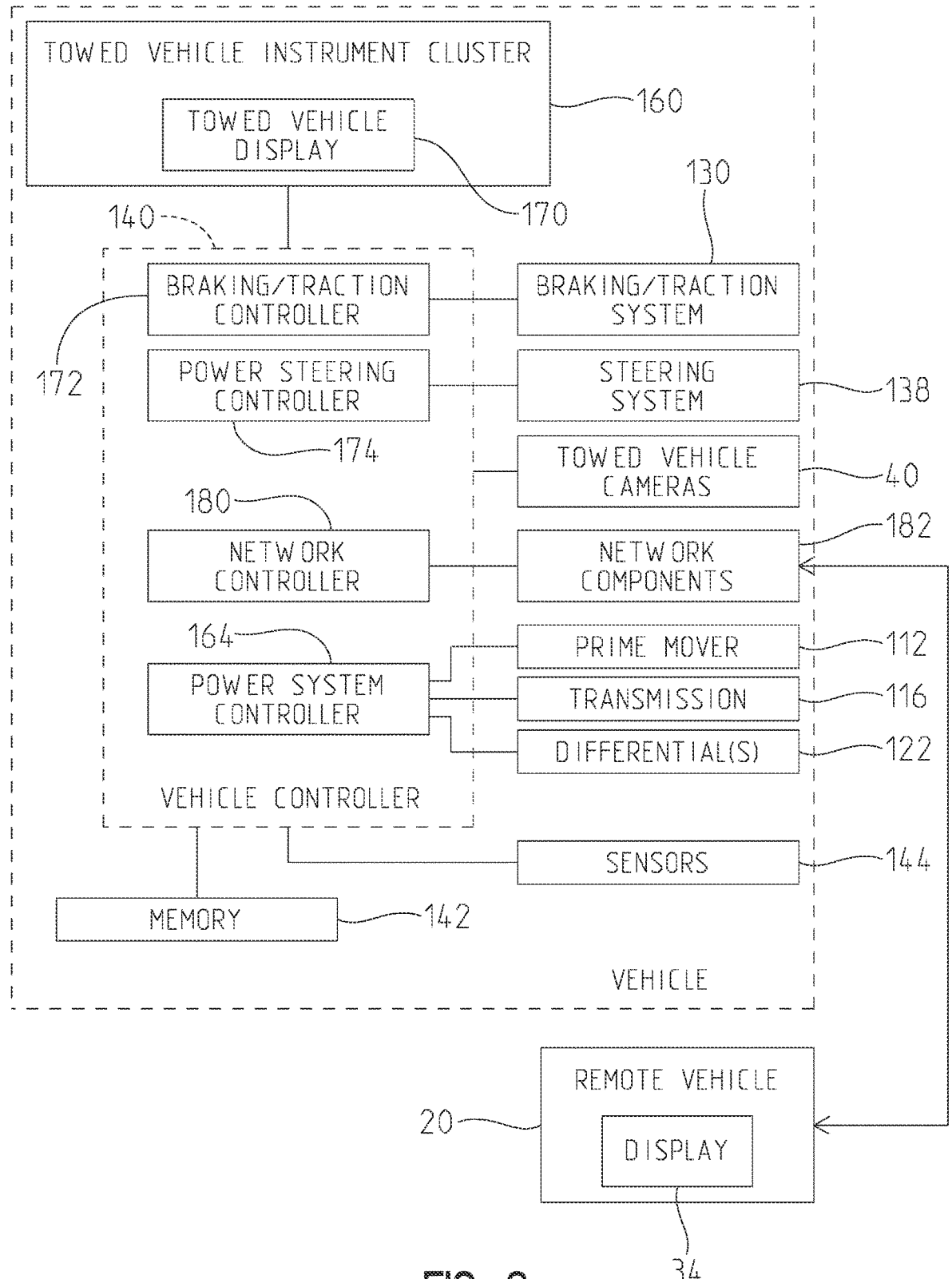
FIG. 8 is a representative view of exemplary components of the recreational vehicle of FIGS. 3 and 4 with images of a camera system of the recreational vehicle provided to a display in a remote vehicle, such as the tow vehicle.

Referring to FIGS. 7-10, portions of recreational vehicle 10 are illustrated with reference to side-by-side recreational vehicle 50 as an example. Side-by-side recreational vehicle 50 includes a vehicle controller 140 having at least one associated memory 142. Vehicle controller 140 provides the electronic control of the various components of side-by-side recreational vehicle 50. Further, vehicle controller 140 is operatively coupled to a plurality of sensors 144 (see FIG. 8) which monitor various parameters of side-by-side recreational vehicle 50 or the environment surrounding side-by-side recreational vehicle 50. Referring to FIG. 8, vehicle controller 140 performs certain operations to control one or more subsystems of other vehicle components, such as one or more components of a propulsion system including a prime mover 112, a transmission 116, a differential 122, illustratively controlled by a power system controller 164 of vehicle controller 140; a steering system 138, illustratively controlled by a power steering controller 174 of vehicle controller 140; a braking/traction system 130, illustratively controlled by a braking/traction controller 172 of vehicle controller 140; and network components 182 illustratively controlled by a network controller 180. Vehicle controller 140 may be a single device or a distributed device (as shown in FIG. 8), and the functions of vehicle controller 140 may be performed by hardware and/or as computer instructions on a non-transitory computer readable storage medium, such as memory 142.

As illustrated in the embodiment of FIG. 8, vehicle controller 140 is represented as including several controllers. These controllers may each be single devices or distributed devices or one or more of these controllers may together be part of a single device or distributed device. The functions of these controllers may be performed by hardware and/or as computer instructions on a non-transitory computer readable storage medium, such as memory 142.

In one embodiment, vehicle controller 140 includes at least two separate controllers which communicate over a network. In one embodiment, the network is a CAN network. In one embodiment, the CAN network is implemented in accord with the J1939 protocol. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, two wire serial communication is used.

As mentioned herein, side-by-side recreational vehicle 50 includes a power system having a prime mover 112, a transmission 116, and at least one differential 122. Exemplary prime movers 112 include internal combustion engines, two stroke internal combustion engines, four stroke internal combustion engines, diesel engines, electric motors, hybrid engines, and other suitable sources of motive force. A transmission 116 is coupled to prime mover 112. In embodiments, transmission 116 may include a shiftable transmission and a continuously variable transmission ("CVT"). In one example, the CVT of transmission 116 is coupled to prime mover 112 and the shiftable transmission is in turn coupled to the CVT. In embodiments, the shiftable transmission of transmission 116 includes a forward high setting, a forward low setting, a neutral setting, a park setting, and a reverse setting.

Transmission 116 is further coupled to at least one differential 122 which is in turn coupled to at least one ground engaging members 52. Differential 122 may communicate the power from transmission 116 to one of ground engaging members 52 or multiple ground engaging members 52. In embodiments, one or both of a front differential and a rear differential are provided. The front differential powering at least one of two front wheels 52 of side-by-side recreational vehicle 50 and the rear differential powering at least one of two rear wheels 52 of side-by-side recreational vehicle 50.

In one example, prime mover 112 is an internal combustion engine and power system controller 164 controls the provision of fuel, provision of spark, engine performance, reverse operation of vehicle, locking differential, all wheel drive, ignition timing, electrical power distribution, transmission control. Further, power system controller 164 monitors a plurality of sensors 144. Exemplary sensors 144 include a temperature sensor which monitors the temperature of a coolant which circulates through the engine, throttle position sensor (TPS), exhaust gas temperature sensor (EGT), crank position sensor (CPS), detonation sensor (DET), airbox pressure sensor, intake air temperature sensor, and other parameters as required to control the engine performance.

As mentioned herein, side-by-side recreational vehicle 50 includes a braking/traction system 130. Generally braking/traction system 130 includes a brake input, such as a brake pedal. In embodiments, braking/traction system 130 includes anti-lock brakes. In embodiments, braking/traction system 130 includes active descent control and/or engine braking. In embodiments, braking/traction system 130 includes a brake and in some embodiments a separate parking brake. Braking/traction system 130 may be coupled to any of prime mover 112, transmission 116, differential 122, and ground engaging members 52 or the connecting drive members therebetween. In one example, braking/traction controller 172 controls pressure and frequency of the actuation of the brake caliper. Further, braking/traction controller 172 monitors a plurality of sensors 144. Exemplary sensors 144 include a vehicle speed sensor which monitors a speed of vehicle 50 relative to ground 18.

Steering system 138 is coupled to at least one of the ground engagement members 102 to direct recreational vehicle 50 in a desired direction of travel. Generally, steering system 138 includes a steering input, such as a steering wheel or other suitable steering inputs. In one example, power steering controller 174 controls an amount of assist provided by a power steering unit of recreational vehicle 50 in the movement of the steering input. Further, power steering controller 174 monitors a plurality of sensors 144. Exemplary sensors and electronic power steering units, including speed profiles, examples of which are provided in U.S. patent application Ser. No. 12/135,107, assigned to the assignee of the present application, titled VEHICLE, the disclosure of which is expressly incorporated by reference herein.

Returning to FIG. 7, vehicle controller 140 also interacts with an operator interface 150 of side-by-side recreational vehicle 50 which includes at least one input device 152 and at least one output device 154. Exemplary input devices 152 include levers, buttons, switches, soft keys, and other suitable input devices. Exemplary output devices include lights, displays, audio devices, tactile devices, and other suitable output devices. Operator interface 150 further includes an interface controller 156 and an associated memory 158. Interface controller 156 performs certain operations to control one or more subsystems of operator interface 150 or of other vehicle components, such as one or more of input devices 152 and output devices 154. In one example, operator interface 150 includes a touch screen display and interface controller 156 interprets various types of touches to the touch screen display as inputs and controls the content displayed on touch screen display. In certain embodiments, the interface controller 156 forms a portion of a processing subsystem including one or more computing devices having memory, processing, and communication hardware. The interface controller 156 may be a single device or a distributed device, and the functions of the interface controller 156 may be performed by hardware and/or as computer instructions on a non-transitory computer readable storage medium, such as memory 158.

Operator interface 150 is included as part of an instrument cluster 160. Interface controller 156 controls the operation of output devices 154 and monitors the actuation of input devices 152. In one embodiment, output devices 154 includes a display 170 and interface controller 156 formats information to be displayed on the display and displays the information. In embodiments, display 170 includes a controller which formats information to be displayed on the display and displays the information. In one embodiment, output devices 154 includes a touch display and interface controller 156 formats information to be displayed on the touch display, displays the information, and monitors the touch display for operator input. Exemplary operator inputs include a touch, a drag, a swipe, a pinch, a spread, and other known types of gesturing.

Referring to FIG. 7, cameras 40 of side-by-side recreational vehicle 50 are operatively coupled to vehicle controller 140. The data output of cameras 40 is provided by vehicle controller 140 to operator interface controller 156 for display as an image on display 170 of operator interface 150. Cameras 40 may be operatively coupled to vehicle controller 140 and/or operator interface controller 156 through wired connections or wirelessly. In embodiments, the output of cameras 40 is displayed on display 170 while side-by-side recreational vehicle 50 is in a first powered mode wherein a movement of side-by-side recreational vehicle 50 relative to the ground 18 is powered by the propulsion system and a direction of side-by-side recreational vehicle 50 is set by steering system 138 through an input by an operator supported by the recreational vehicle. In embodiments, the output of cameras 40 is displayed on display 170 while side-by-side recreational vehicle 50 is in a second non-powered configuration wherein the propulsion system is unable to power movement of side-by-side recreational vehicle 50 relative to the ground. Examples of a non-powered configuration include when prime mover 112 is not running, when transmission 116 is in a neutral setting, and/or when transmission 116 is in a park setting.

In embodiments, one or more of cameras 40 is a 360 degree view camera positioned on top of side-by-side recreational vehicle 50 and provides a 360 view of the environment surrounding side-by-side recreational vehicle 50. In embodiments, the data output from multiple cameras 40 are provided to vehicle controller 140 and operator interface controller 156 and stitched together to provide a 360 degree view of the environment surrounding side-by-side recreational vehicle 50. In embodiments, the output of each camera 40 is selectable for view on display 170 through the selection of one or more input devices 152.

When prime mover 112 is not running, vehicle controller 140 and cameras 40 are powered by a battery 178 (see FIG. 7) of side-by-side recreational vehicle 50. In embodiments, recreational vehicle 50 may be coupled to a power source of truck 20 through a harness. In embodiments, in the non-powered configuration, recreational vehicle 50 may operate in a low power mode wherein vehicle controller periodically or on request wakes up and provides the output of cameras 40 and otherwise is in a sleep mode. In embodiments, recreational vehicle 50 is awakened from the low power mode by an operator input received from an input in tow vehicle 20, a user handheld device, such as a phone 190, or from instrument cluster 160. In embodiments, recreational vehicle 50 is awakened from the low power mode based on a speed of recreational vehicle 50 relative to the ground being below a threshold speed. In one embodiment, a speed of recreational vehicle 50 is inferred from a detected speed of the tow vehicle 20 (such as provided over a wired connection with the tow vehicle) or from GPS data provided by a GPS system of the recreational vehicle 50 or a user handheld device, such as phone 190. In embodiments, once the inferred speed of recreational vehicle 50 exceeds the threshold speed, recreational vehicle 50 enters the low power mode. When prime mover 112 is running, but transmission 116 is in a park setting, vehicle controller 140 and cameras 40 may be powered by an electrical system powered by prime mover 112 or by battery 178.

Referring to FIG. 8, when side-by-side recreational vehicle 50 is positioned on trailer 12 and is placed in a non-powered configuration, the output of cameras 40 may be displayed on the towed vehicle display 170 of side-by-side recreational vehicle 50. In addition or as an alternative, vehicle controller 140 through network controller 180 and network components 182 may provide the output of at least camera 40A (or whichever one of cameras 40 is facing the rear of trailer 12) to truck 20 for display on display 34 in the operator area 30 of truck 20. The output of other cameras 40 may also or alternatively be provided to truck 20 for display on display 34 in the operator area of truck 20.

Network controller 180 controls communications between side-by-side recreational vehicle 50 and other devices through one or more network components 182. In one embodiment, network controller 180 of side-by-side recreational vehicle 50 communicates with remote devices over a wireless network. An exemplary wireless network is a radio frequency network and network components 182 include a radio frequency antenna. In one example, the wireless network is a WiFi network. In another example, the wireless network is BLUETOOTH network. Network controller 180 controls the communications between side-by-side recreational vehicle 50 and the remote device. Exemplary remote devices include truck 20, display 170 when removed from side-by-side recreational vehicle 50, and a personal computing device 190, such as a mobile smart phone, having a display 192.

In embodiments, network controller 180 of side-by-side recreational vehicle 50 communicates with remote devices over a cellular network. In this example, network components 182 includes a cellular antenna and network controller 180 receives and sends cellular messages from and to the cellular network. In embodiments, network controller 180 of side-by-side recreational vehicle 50 communicates with remote devices over a satellite network. In this example, network components 182 includes a satellite antenna and network controller 180 receives and sends messages from and to the satellite network.

Figure 9:
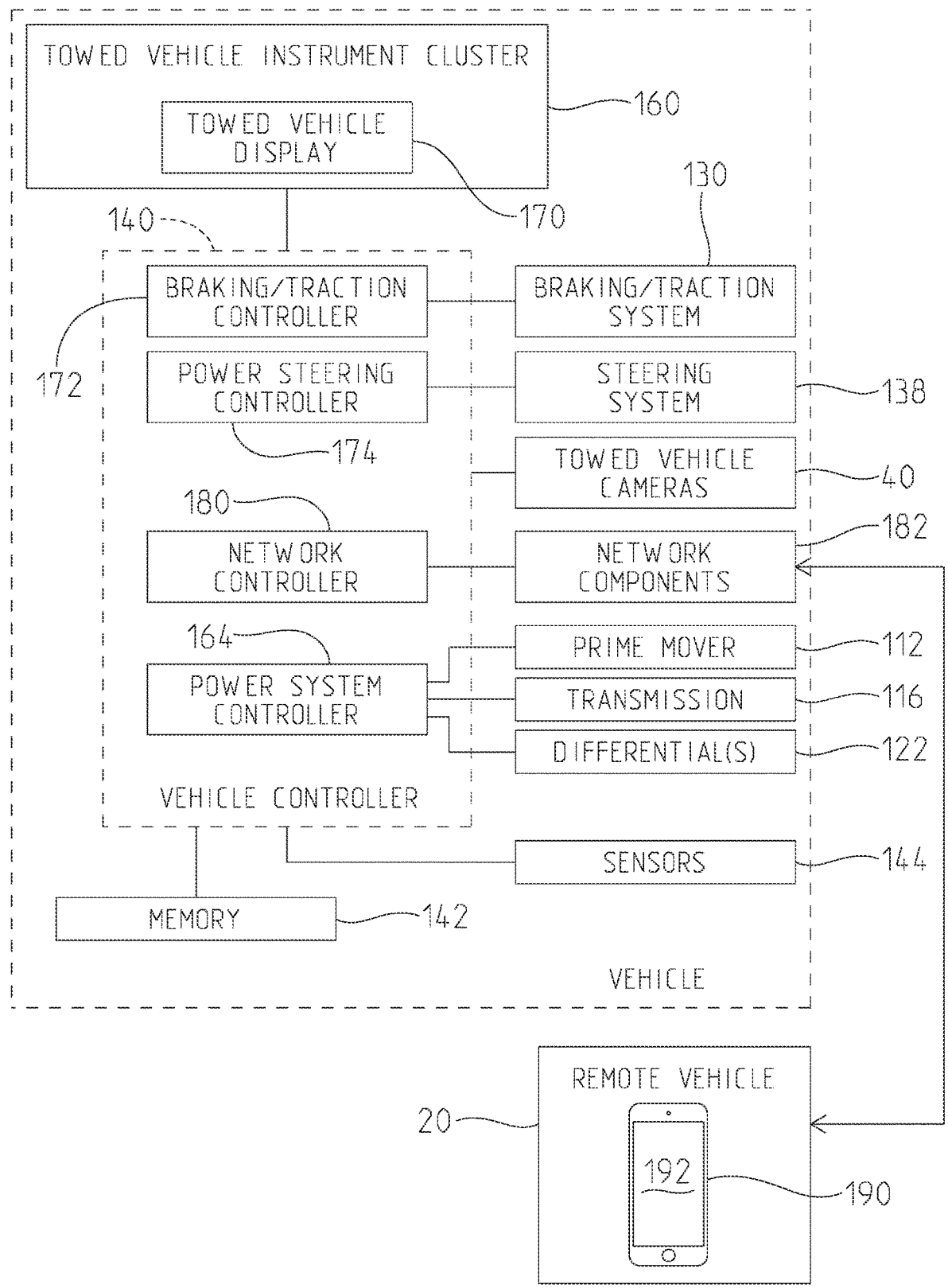
FIG. 9 is a representative view of exemplary components of the recreational vehicle of FIGS. 3 and 4 with images of a camera system of the recreational vehicle provided to a display on a personal computing device, such as a smart phone.

Referring to FIG. 9, when side-by-side recreational vehicle 50 is positioned on trailer 12 and is placed in a non-powered configuration, the output of cameras 40 may be displayed on the towed vehicle display 170 of side-by-side recreational vehicle 50. In addition or as an alternative, vehicle controller 140 through network controller 180 and network components 182 may provide the output of at least camera 40A (or whichever one of cameras 40 is facing the rear of trailer 12) to personal computing device 190 for display on the display 192 personal computing device 190 while personal computing device 190 is positioned in the operator area 30 of truck 20. The output of other cameras 40 may also or alternatively be provided to personal computing device 190 for display on display 192.

Figure 10:
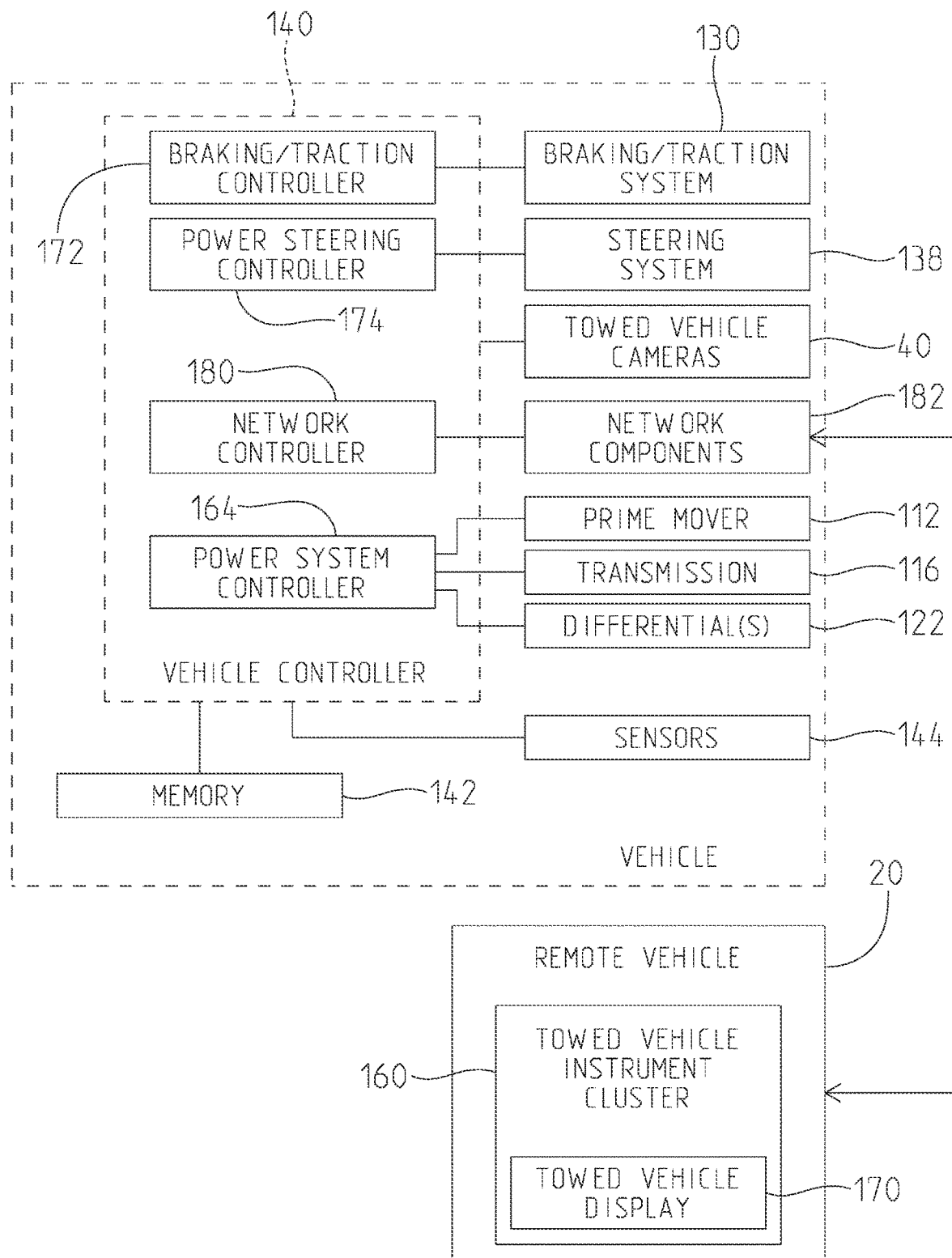
FIG. 10 is a representative view of exemplary components of the recreational vehicle of FIGS. 3 and 4 having a removable display and images of a camera system of the recreational vehicle provided to the removable display in a remote vehicle, such as the tow vehicle.

Referring to FIG. 10, when side-by-side recreational vehicle 50 is positioned on trailer 12 and is placed in a non-powered configuration, the output of cameras 40 may be displayed on the towed vehicle display 170 of side-by-side recreational vehicle 50. In embodiments, the towed vehicle display may be removable from the remainder of side-by-side recreational vehicle 50 and include a network controller and network components, similar to network controller 180 and network components 182, and include at least one of an internal power source, such as a battery, or a power input connection. The power input connection may receive a cable which is coupled to a power source of truck 20 and provides power to display 170. An exemplary cable is a USB cable. In this example, display 170 is removable from side-by-side recreational vehicle 50 and positionable in operator area 30 of truck 20 so that the output of cameras 40 is displayed within operator area 30 of truck 20. Further, vehicle controller 140 through network controller 180 and network components 182 may provide the output of at least camera 40A (or whichever one of cameras 40 is facing the rear of trailer 12) to display 170 for display on display 170 while display 170 is positioned in the operator area 30 of truck 20. The output of other cameras 40 may also or alternatively be provided to display 170.

In each of the embodiments disclosed in FIGS. 8-10, the output of cameras 40 of towed side-by-side recreational vehicle 50 is viewable from within operator area 30 of truck 20. An advantage, among others, is these embodiments provide an operator of truck 20 with a view of the environment directly rearward of trailer 12 without the need to have a camera system be included as part of trailer 12. A further advantage, among others, is that that embodiments of FIGS. 9, and 10 provide the operator of truck 20 with a view of the environment directly rearward of trailer 12 without the need to have a display 34 of truck 20 communicate with a camera system of trailer 12. Thus, the present embodiments may be used with any conventional tow vehicle because the inclusion of a display 34 is not required.

Figure 11:
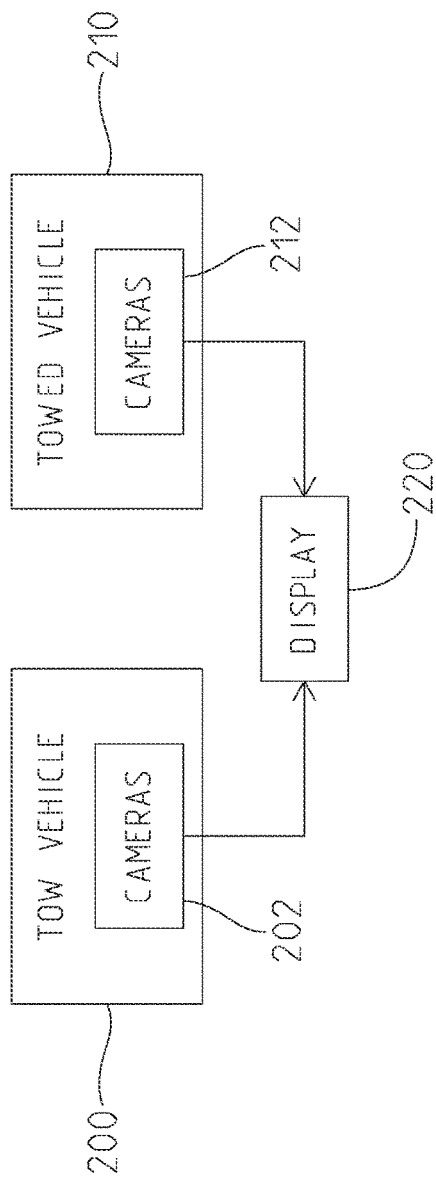
FIG. 11 is a representative view of a combined camera system of the tow vehicle and the towed vehicle.

Referring to FIG. 11, in embodiments, a tow vehicle 200 includes one or more cameras 202 and a towed vehicle 210 includes one or more cameras 212. Data from each of cameras 202 and cameras 212 are provided to a display 220 to provide at least one image on the display based on the data received from cameras 202 and cameras 212. In embodiments, the data from cameras 202 and cameras 212 is stitched together to provide a 360 degree view of the environment surrounding the tow vehicle 200 and the towed vehicle 210. In embodiments, the data from cameras 202 and 212 are provided to display 220 to provide multiple images on the display 220.

Figure 12:
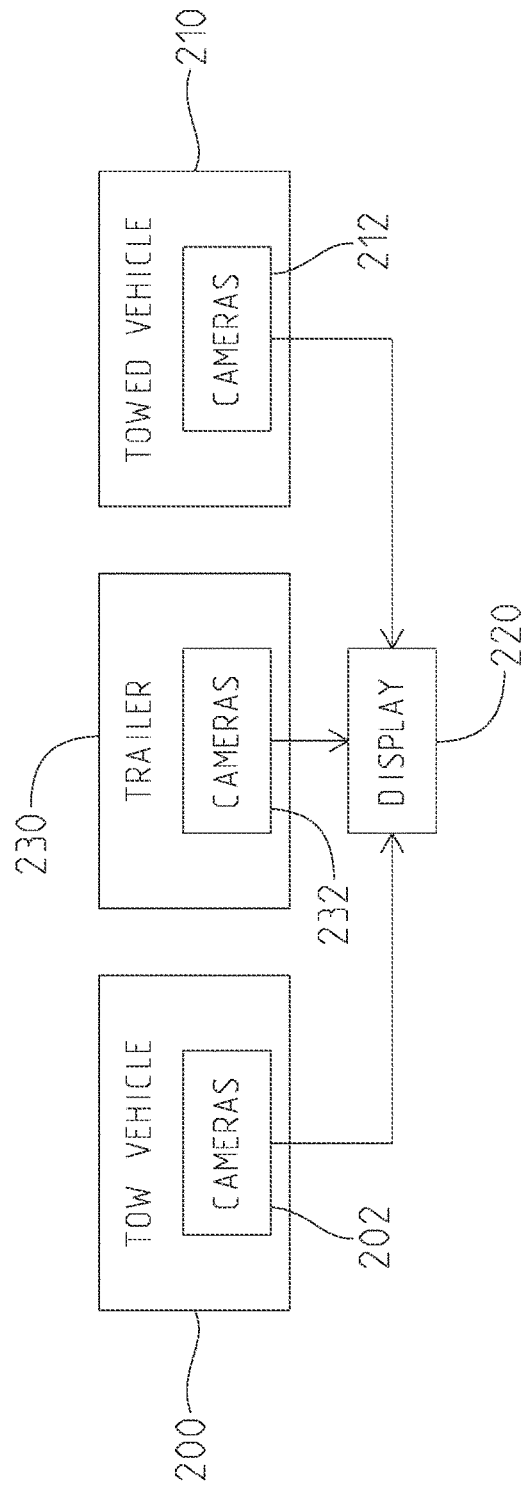
FIG. 12 is a representative view of a combined camera system of the tow vehicle, the trailer, and the towed vehicle.

Referring to FIG. 12, in embodiments, a tow vehicle 200 includes one or more cameras 202, a trailer being towed by the tow vehicle includes one or more cameras 232, and a towed vehicle 210 supported on the trailer includes one or more cameras 212. Data from at least two of cameras 202, cameras 212, and cameras 232 are provided to a display 220 to provide at least one image on the display based on the data received from cameras 202, cameras 212, and cameras 232. In embodiments, the data from cameras 202, cameras 212, and cameras 232 is stitched together to provide a 360 degree view of the environment surrounding the tow vehicle 200, trailer 230, and the towed vehicle 210. In embodiments, the data from cameras 202, cameras 212, and cameras 232 are provided to display 220 to provide multiple images on the display 220.

Figure 13:
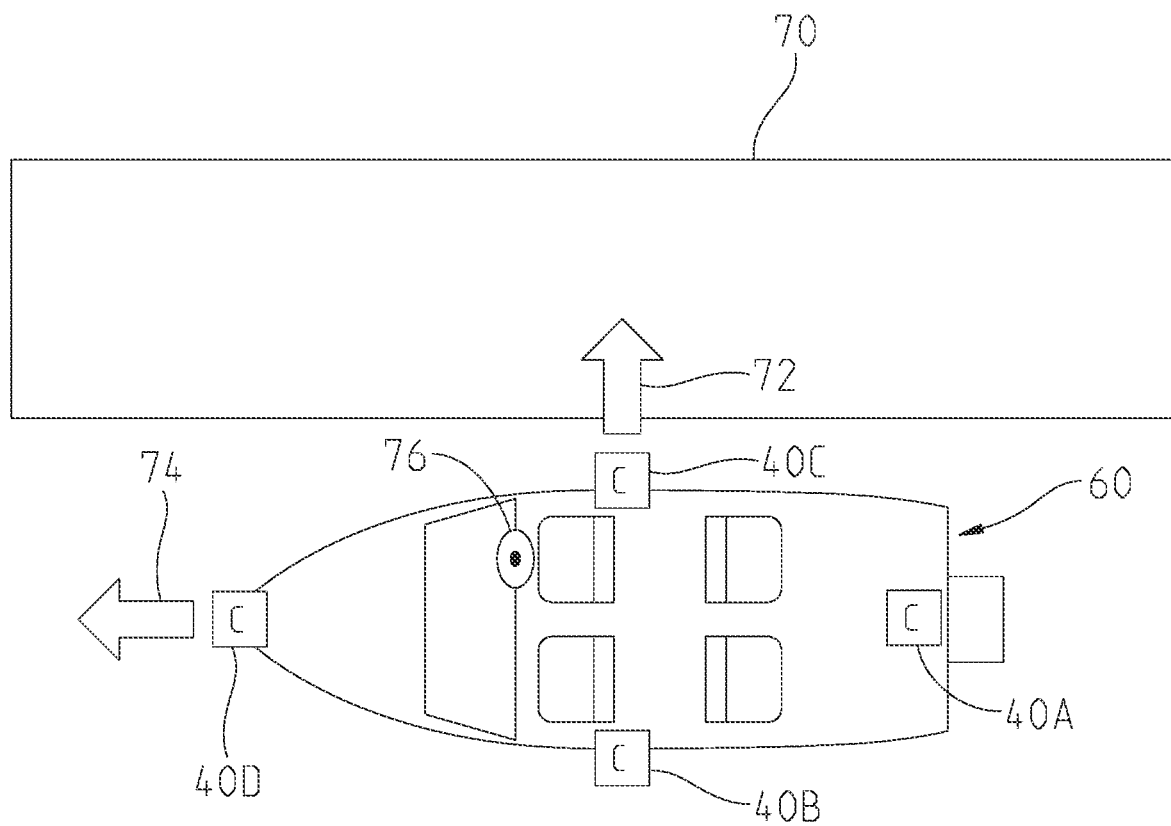
FIG. 13 is a top view of a representative boat comprising a camera system according to aspects of the present disclosure.
Figure 14:
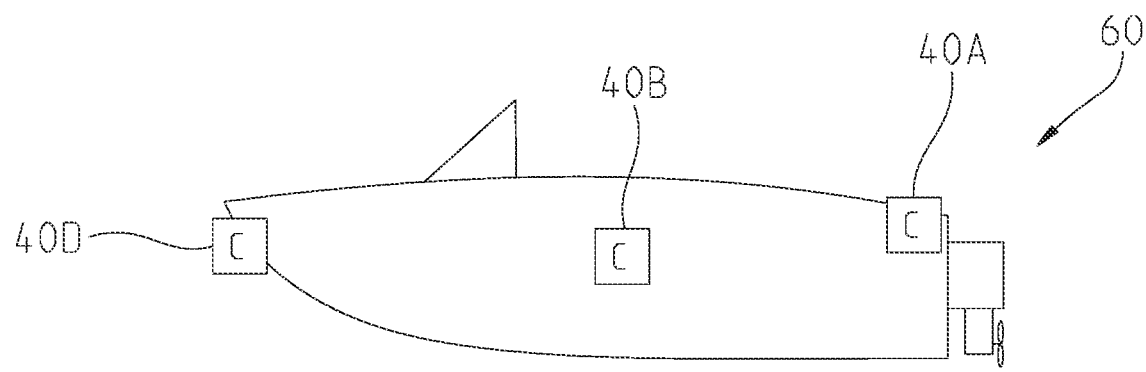
FIG. 14 is a side view of the boat of FIG. 13.

With reference now to FIGS. 13 and 14, additional aspects of the boat 60 (as was discussed above with reference to FIGS. 5 and 6) are discussed. As illustrated, the boat 60 is removed from trailer 12, such that it may be placed in water (not shown). In addition to the camera 40A discussed above with reference to FIGS. 5 and 6, additional cameras 40B, 40C, and 40D are illustrated. For example, a camera 40B is illustrated on the port side of boat 60, a camera 40C is illustrated on the starboard side of boat 60, and a camera 40D is illustrated on the bow end of boat 60.

While cameras 40A-40D are shown in FIGS. 13 and 14, it will be appreciated that any of a variety of alternative and/or additional camera placements may be used. As an example, multiple cameras may be placed at the bow end of boat 60, thereby providing images of different portions of the environment surrounding boat 60. For instance, a first camera may view the environment at or above the horizon so as to provide a relatively long-distance view (e.g., of where boat 60 may be heading), while a second camera may view the environment below the horizon so as to provide a view of the water and/or waterline relatively near the bow end of boat 60. Similarly, multiple cameras may be placed at the starboard and/or port sides of boat 60, thereby providing different views (e.g., a relatively long-distance view and a view that provides a relevant view when docking alongside a dock 70).

As discussed above with reference to FIGS. 7-10, data output of cameras 40A-40D is received by vehicle controller 140, such that it may be provided for display on display 170 of operator interface 150, display 34 of remote vehicle 20, display 192 of phone 190, and/or towed vehicle display 170. In some instances, vehicle controller 140 provides a subset of the received data output for display.

For example, if it is detected that boat 60 is moving toward dock 70, as illustrated by arrow 72, vehicle controller 140 may automatically select the data output of camera 40C. As a result of the selection, data output from other cameras (e.g., cameras 40A, 40B, and 40D) may be at least temporarily omitted from the data provided for display or, as another example, the data output from camera 40C may be emphasized relative to other cameras 40A, 40B, and 40D. As discussed above, data output from multiple cameras may be stitched together. For instance, data output from cameras 40A, 40C, and 40D may be stitched together when docking, thereby providing a more detailed view of dock 70. Similarly, if it is detected that boat 60 is moving forward, as illustrated by arrow 74, data output from camera 40D may be selected for presentation.

In some instances, explicit operator input may be received by vehicle controller 140 (e.g., via operator interface 150) indicating a selection of one or more of cameras 40A-40D. In other examples, vehicle controller 140 may automatically select a subset of cameras (e.g., in addition to or as an alternative to explicit and/or implicit operator inputs). For example, implicit operator input may be processed by vehicle controller 140 to select one or more cameras. Thus, as compared to explicit input comprising a camera selection of the operator, implicit input comprises one or more actions performed by the operator (e.g., associated with operating boat 60), from which one or more cameras 40A-40D may be automatically determined.

For instance, vehicle controller 140 may evaluate operator input associated with steering wheel 76 (which may be part of steering system 138 discussed above). Accordingly, when it is determined that the operator is steering boat 60 to the right, vehicle controller 140 may select data output associated with camera 40C. As another example, vehicle controller 140 may stitch data output from multiple cameras, which may then be panned according to a change in an identified direction of travel. Returning to the above example, as the operator steers boat 60 to the right, the displayed image may shift from centering on data output associated with camera 40D toward data output associated with camera 40C. It will be appreciated that any of a variety of other explicit and/or implicit inputs may be processed according to aspects described herein.

It will be appreciated that vehicle controller 140 may use any of a variety of techniques and associated data (e.g., in addition to or as an alternative to implicit input) to automatically select a subset of cameras. For example, proximity data from one or more proximity sensors, GPS data, data from power system controller 164, and/or data from power steering controller 174, may be evaluated to determine a heading and/or speed. If it is determined that the boat is moving in a given direction and/or at a speed above or below a predetermined threshold, a camera associated with the direction may be selected accordingly. As another example, the evaluation may comprise determining a primary direction component from the direction of travel of the boat. For example, it may be determined that boat 60 is moving primarily along arrow 72 toward dock 70, even though boat 60 is also moving along arrow 74, albeit at a slower rate. In other instances where boat 60 is moving multiple directions, data output from multiple cameras may be stitched together. As a further example, if boat 60 is moving below a predetermined threshold, a "birds-eye" view (e.g., comprising stitched together data from cameras 40A-40D) may be presented, thereby providing the operator with information usable to avoid potential obstacles. By contrast, if boat 60 is moving above a predetermined threshold (which may be the same or a different threshold), one camera associated with the direction of travel may be selected.

Additionally, data from sensors 144 may be used. For example, sensors 144 may comprise an inertial measurement unit (IMU), which may generate movement data that is processed by vehicle controller 140. For instance, if it is determined that boat 60 is operating at an incline (e.g., as may be the case during acceleration or when traveling over waves), vehicle controller 140 may select camera 40D to provide the operator with relevant information while moving forward along arrow 74. As another example, a TPS may be used to make such a determination. In instances where multiple cameras are positioned at a similar location, vehicle controller 140 may select between the similar cameras. Returning to the above example with a first camera at or above the horizon and a second camera below the horizon, vehicle controller 140 may select the second camera below the horizon during acceleration, as the data output of the first camera may be comparatively less useful as a result of its positioning.

In some instances, computer vision techniques may be used to perform object recognition using data output of cameras 40A-40D. As an example, trailer 12 may be detected within the data output from camera 40D, such that camera 40D is selected in response. As another example, dock 70 may be detected within the data output of camera 40C, such that camera 40C is selected in response.

Thus, a set of rules may be used to process any of a variety of data and determine one or more cameras from a set of available cameras accordingly. In other examples, a mapping may exist between a direction of travel and one or more cameras associated with the direction of travel. As illustrated in FIG. 13, a mapping may exist between the direction of travel indicated by arrow 74 and camera 40D, as well as the direction of travel indicated by arrow 72 and camera 40C.

The selected camera may change in response to a change in the direction of travel of boat 60 (e.g., as the boat shifts from traveling along arrow 72 to traveling along arrow 74). As an example, a predetermined threshold may be used to determine when to change cameras, such as according to a predetermined amount of time or determining that boat 60 is travelling at a greater speed in one direction than another direction. Such techniques may be used to avoid unnecessary or rapid camera changes in certain conditions (e.g., as may be the case when waves or the wake of another boat, not pictured, affect the direction of travel of boat 60).

In an example where the operator is docking boat 60 and loading boat 60 onto trailer 12, vehicle controller 140 may initially determine a movement of boat 60 substantially along arrow 72 (e.g., toward dock 70), thereby causing camera 40C to be selected. However, as movement of boat 60 shifts to be substantially along arrow 74 (e.g., toward trailer 12), camera 40D may be selected instead of or in addition to camera 40C. As another example, vehicle controller 140 may detect the presence of trailer 12 based on the identification of a radio frequency emitted by trailer 12 and/or remote vehicle 20, among other examples.

It will be appreciated that the aspects discussed above are similarly applicable to any of a variety of other vehicles. Additionally, any of a variety of additional or alternative data may be used to identify the explicit/implicit selection and/or automatically determine one or more cameras from a set of cameras (e.g., cameras 40A-40D). For instance, by virtue of being a watercraft, boat 60 may not have a braking/traction controller, whereas such data may be available in the context of other types of recreational vehicles, such that it may be used in accordance with the above-discussed aspects. For example, if data received from braking/traction controller 172 indicates a vehicle is experiencing reduced traction, a camera may be determined based on the vehicle's direction of travel (which may differ from the direction specified by power steering controller 174) to provide relevant information to the operator of the vehicle.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method of automatically presenting an image from a subset of cameras to an operator of a recreational vehicle, the method comprising:
   determining a direction of travel of the recreational vehicle;
   generating, based on the determined direction of travel, the subset of cameras from a set of cameras supported by the recreational vehicle, wherein the set of cameras comprises:
      a first camera positioned to monitor a first portion of an environment associated with a front of the recreational vehicle; and
      a second camera positioned to monitor a second portion of the environment different from the first portion of the environment associated with the front of the recreational vehicle, the second camera being positioned higher than the first camera;
   receiving with an electronic controller data from the generated subset of cameras supported by the recreational vehicle; and
   providing by the electronic controller an image for presentation by a display based on the received data from the subset of cameras, wherein in response to determining the recreational vehicle is accelerating, the subset of cameras includes the first camera.

2. The method of claim 1, wherein the recreational vehicle is a boat.

* * * * *